United States Patent [19]
Beeghly

[11] 3,933,139
[45] Jan. 20, 1976

[54] CAPACITIVE DISCHARGE IGNITION SYSTEM

[75] Inventor: Bruce R. Beeghly, Liberty Township, Trumbull County, Ohio

[73] Assignee: The Economy Engine Company, Girard, Ohio

[22] Filed: Jan. 22, 1971

[21] Appl. No.: 108,795

[52] U.S. Cl. .............................. 123/148 E; 315/209
[51] Int. Cl.² ........................................... F02P 1/00
[58] Field of Search .................. 123/148 E; 315/209

[56] References Cited
UNITED STATES PATENTS

| | | | |
|---|---|---|---|
| 3,335,320 | 8/1967 | Quinn | 315/209 |
| 3,367,314 | 2/1968 | Hirosawa et al. | 123/148 E |
| 3,461,851 | 8/1969 | Stephens | 123/148 E |
| 3,464,397 | 9/1969 | Burson | 123/148 E |
| 3,553,529 | 1/1971 | Strelow | 123/148 E X |
| 3,576,183 | 4/1971 | Miyamoto | 123/148 E |
| 3,704,701 | 12/1972 | Struber | 123/148 |

*Primary Examiner*—Charles J. Myhre
*Assistant Examiner*—Ronald B. Cox
*Attorney, Agent, or Firm*—Webb, Burden, Robinson & Webb

[57] ABSTRACT

An electronic breakerless ignition system for an internal combustion engine. The ignition system comprises an alternating current generator synchronized with the engine. A rectifier circuit charges a storage capacitor. The storage capacitor is in series with a thyristor and the output of the ignition system, for example, a high tension ignition coil. The thyristor is triggered to discharge the storage capacitor by a voltage sensitive trigger circuit. One end of the trigger circuit is connected to the trigger terminal of the thyristor and the other end to one terminal of the generator.

20 Claims, 10 Drawing Figures

INVENTOR.
BRUCE R. BEEGHLY
BY
Webb, Burden, Robinson & Webb

CAPACITIVE DISCHARGE IGNITION SYSTEM

This invention relates to an electronic breakerless capacitive discharge ignition system for internal combustion engines.

It is an advantage of ignition systems according to this invention that there are only a minimum of moving parts. This ignition system having no rotating breaker cam or breaker points eliminates a weak point and source of inefficiency in known ignition systems. Furthermore, breaker points limit the voltage that may be used to cross the primary winding in the ignition coil. Another mechanical device (such as a pickup coil and a rotating vane with a configuration to create intermittent inductive signals for triggering discharge) has not been substituted for the breaker points.

A further advantage of this invention is that an electronic retard and advance in the timing is provided. A still further advantage in this ignition system is that it is self-regulatory over large range of engine speeds; that is, there is no need for special control elements to limit the voltage in the storage capacitor.

Ignition systems according to this invention have yet another advantage: They may be used with only one distributor and in some instances with no distributor whatsoever. This further minimizes the number of moving parts that may fail by wear and tear.

Briefly, according to this invention, an ignition system for an internal combustion engine comprises an alternating current generator, synchronized with the engine. A rectifying circuit connected to the generator charges a storage capacitor with a direct current. A circuit is provided for discharging the storage capacitor, for example, through the primary of an induction coil. This discharge creates a large voltage and sufficient energy within the secondary circuit including at least one spark plug and perhaps a distributor to cause sufficient potential across the spark plug electrodes to ionize the plug gap and produce a gaseous discharge for ignition of the air fuel mixture in the engine combustion chamber.

The discharge circuit comprises a storage capacitor and a thyristor. A thyristor is a semiconductor device (with two or more junctions) that may be switched between nonconducting and conducting states. Thyristors include, among others, silicon controlled rectifiers (SCR's), silicon controlled switches (SCS's), gate controlled switches (GCS's) and Triac's. An SCR is a unidirectional thyristor having two main terminals and one trigger terminal. A Triac is a bidirectional thyristor having three terminals. It may be switched into the conducting state by a gate or trigger voltage of either polarity regardless of the polarity across the main terminals.

A voltage sensitive circuit is provided which, for example, comprises a zener diode connected in series with a rectifying diode, one side of the generator and the trigger terminal of the thyristor. When the voltage in the trigger circuit reaches a threshold voltage, for example, the zener voltage, the thyristor is triggered discharging the capacitor, for example, through the primary winding of the coil as described above.

A zener diode is not the only element with a threshold voltage that may be used according to this invention in a voltage sensitive circuit. For example, a Diac may be used. A Diac is a three layer bidirectional avalanche diode which exhibits a negative resistance characteristic when the voltage across the device reaches a breakover point.

According to a preferred embodiment of this invention, the half cycles of the generator output have dissimilar maximum absolute open circuit voltages. It is preferable that the half cycle, which is fed to the trigger circuit, has an absolute open circuit maximum voltage two to five times greater than the other half cycle. This is provided by a generator or magneto having two windings each made up of one or more coils on a common core or stator. The one winding has about two to five times the number of turns as the other. The output of each winding is directed to a half wave rectifier. The rectified output of the high turn winding charges the capacitor and triggers the discharge of the thyristor. It provides most of the output at low speeds. The rectified output of the low turn winding only charges the storage capacitor providing most of the output at high speeds. This arrangement permits the advancing and retarding of the discharge as hereafter explained in detail.

Further features and other objects and advantages of this invention will become clear from reading the following detailed description made with reference to the drawings in which.

Figure 6:
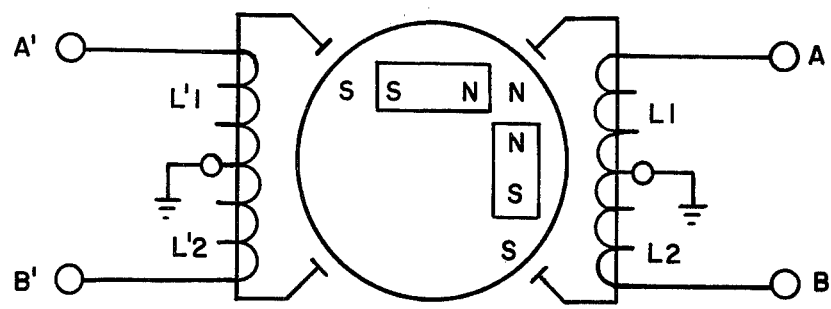
Figure 7:
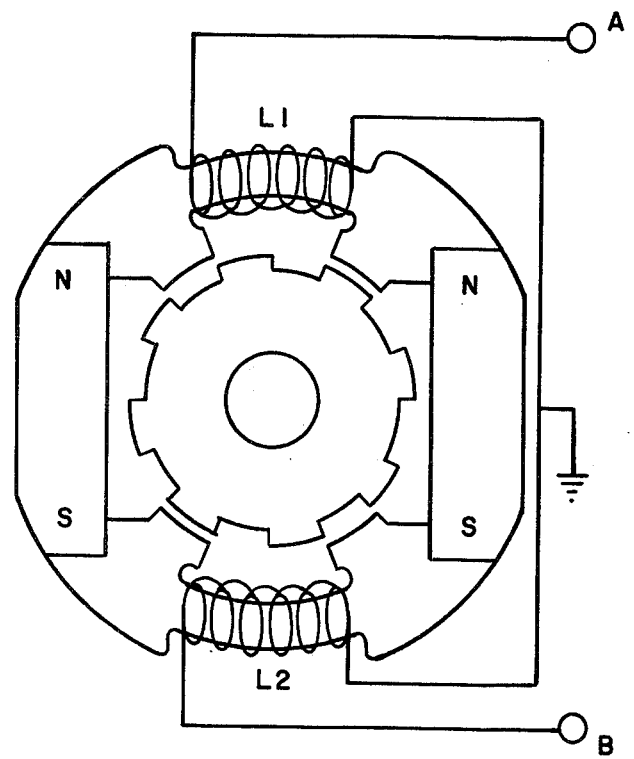

FIGS. 6 and 7 schematically show alternate magneto arrangements suitable for use with ignition systems according to this invention.

Figure 8:
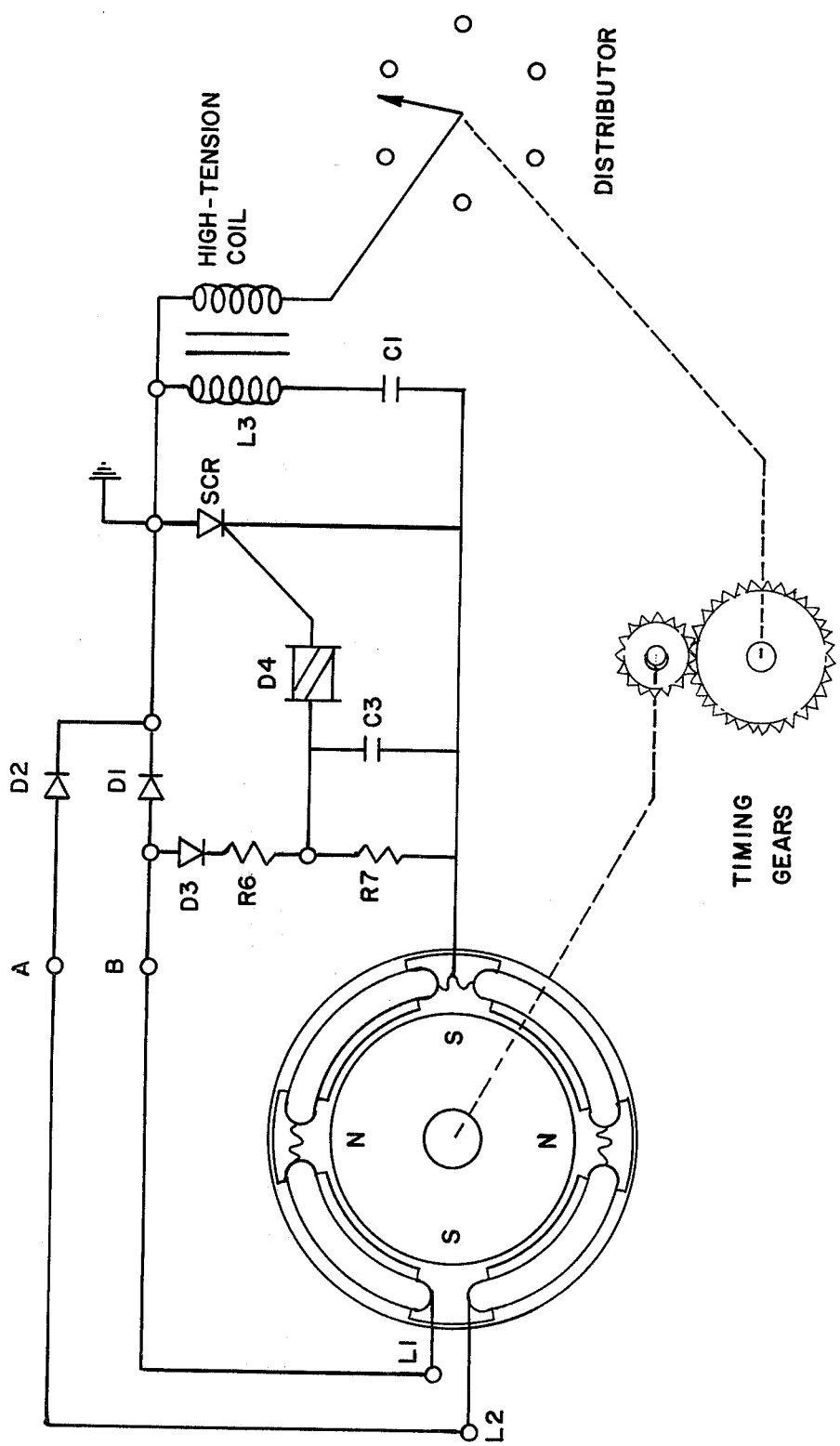

FIG. 8 shows an alternate ignition system according to this invention suitable for six cylinder engines.

Figure 1:
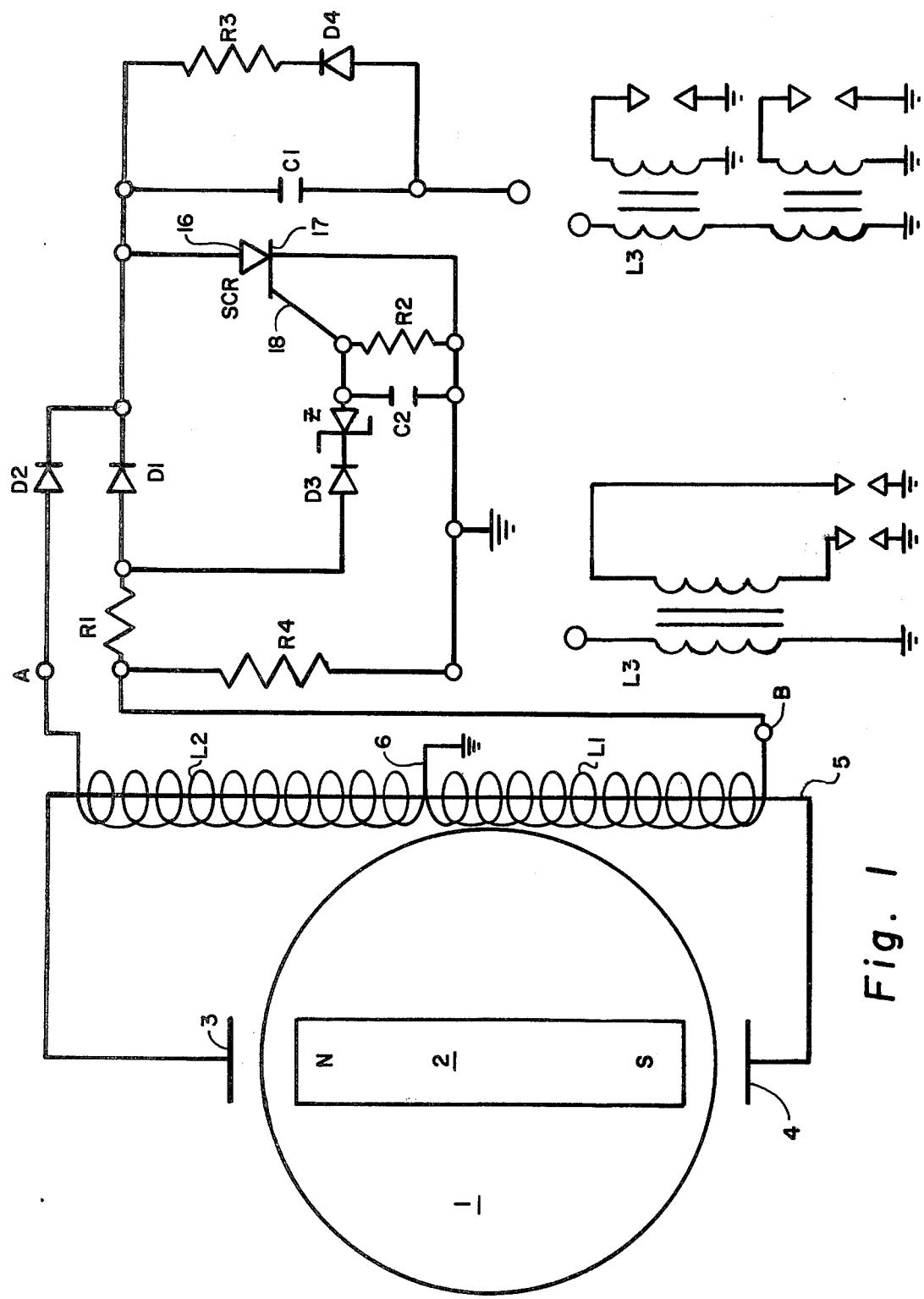
FIG. 1 is a schematic diagram of one embodiment of an ignition system according to this invention with alternate circuits shown for the distribution and spark plugs.

Referring to FIG. 1, there is shown a schematic of a two pole magneto generator 1 having the permanent magnets incorporated in a rotor 2. The two pole rotor has adjacent pole shoes 3 and 4 and two windings on a straight core 5. As the two pole rotor rotates one revolution, two complete magnetic flux reversals occur through the straight core 5. This creates one positive and one negative pulse in windings L1 and L2. According to a preferred embodiment, windings L1 and L2 have unequal turns and are arranged to generate in opposite polarities with respect to a common tap 6.

Figure 2:
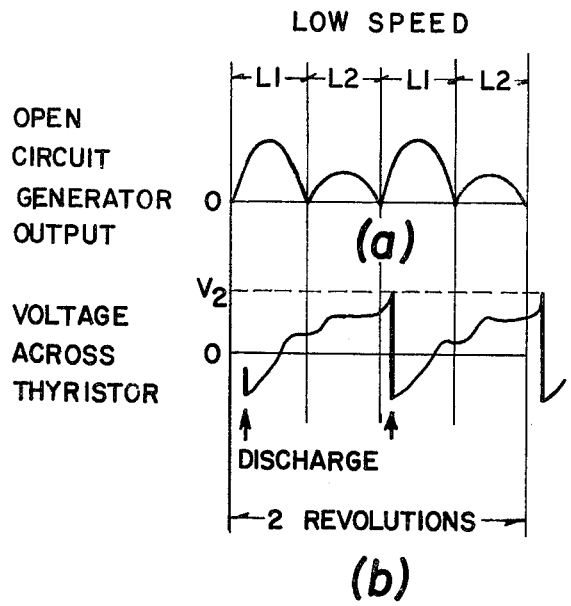
FIGS. 2 and 3 show the wave form of the voltage at two points in the system shown in FIG. 1 at high and low speeds.
Figure 3:
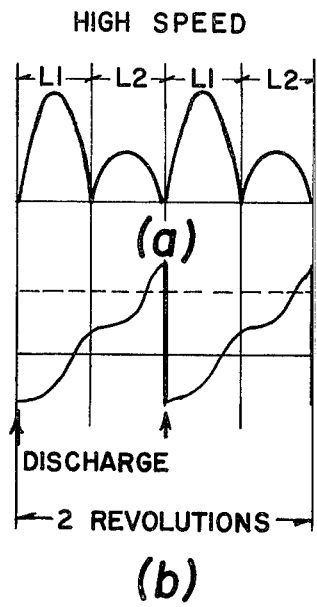

The open circuit voltage outputs from L1 and L2 are shown in FIGS. 2a and 3a. The time scales (horizontal coordinates) which show which winding L1 or L2 is providing output are in relative terms; the scale for FIG. 2 is not the same as for FIG. 3.

Diodes D1 and D2 comprise the elements of a center tap rectifier circuit for charging storage capacitor C1. Due to the arrangement of the diodes in the rectifier circuit, succeeding voltage pulses from the windings L1 and L2 even though of opposite polarity both charge capacitor C1. According to the preferred embodiment wherein the windings L1 and L2 are of unequal turns, the high turns winding provides most of the output at low speeds whereas the low turns winding provides most of the output at higher speeds.

The storage capacitor is connected in series with the thyristor, for example, an SCR, which at the appropriate time is triggered to discharge the capacitor through the primary winding of the induction coil L3.

A silicon controlled rectifier has two modes of operation. It normally blocks flow of current in both directions but can be triggered to allow current to flow in the forward direction while still blocking the reverse current. It is triggered into conducting condition by a small pulse current fed to the trigger terminal 18 (sometimes called gate). Once conducting, a silicon controlled rectifier continues to conduct until the load current is reduced to almost zero or back voltage or current is applied.

In the ignition system according to this invention, the ringing action caused by discharge of the storage capacitor C1 through the primary winding L3 causes a reverse voltage across the SCR and the capacitor C1. This reverse returns the SCR to its nonconducting state.

Resistor R3 and diode D4 (in series) connected in parallel with storage capacitor C1 or individually connected in parallel with storage capacitor C1 may be used to reduce the negative voltage excursion of C1 thus resulting in the higher charge on C1 before the SCR is triggered.

Diode D3 and zener diode Z comprise the basic elements of a voltage sensitive circuit for triggering the SCR. The elements are connected in series between one of the output windings L1 of the magneto and the trigger terminal 18 of the SCR. In a preferred embodiment of this invention, the trigger circuit is connected to the winding with the larger number of turns. A zener diode is a rectifier with a well defined reverse breakdown at low voltages. In the reverse direction, the leakage current is low until the breakdown point or threshold is reached and then the reverse current increases very rapidly for small voltage increases. Hence, when the voltage in winding L1 goes positive by more than the threshold voltage (zener voltage) of zener diode Z, it begins to conduct thus triggering the SCR. The zener diode is selected with the breakdown voltage sufficient to provide triggering at too low a voltage.

At low speeds a high turns winding L1 will charge storage capacitor C1 to the zener voltage $V_z$ before the silicon controlled rectifier can be triggered. This results in a timing retard at low speeds as well as insuring a specific minimum output discharge $V_z$ through the primary of the high tension coil L3. As speed increases, the storage capacitor C1 will be charged to above the zener voltage $V_z$ by winding L2. Triggering of the SCR will then occur just as the voltage polarity switches with L1 going positive.

As the angular velocity of the generator rotor increases, the charge output for a single revolution decreases. The total energy transferred by way of the magnetic fields to the coils for any revolution is approximately constant. However, at higher angular velocities, higher voltage (energy/charge) and smaller charge outputs are obtained. Furthermore, the larger the number of turns on a given winding, the higher the voltage and lower the charge output. The current output of the generator during a given revolution is critical as a definite amount of charge is necessary to fill the capacitor to a particular voltage. Of course, the generator voltage must be sufficient to do the work of moving the charges to the capacitor. Hence, by having two windings of unequal turns, sufficient current and voltage is assured over a large range of speeds.

Resistor R1 can be used to slow the charging rate of the winding L1 to prevent it from recharging to the zener voltage $V_z$ before the polarity switch occurs. This would result in a second unneeded (but in most cases unharmful) spark. The zener voltage $V_z$ is typically from 40 to 90% of the desired full speed capacitor voltage.

Capacitor C2 and/or resistor R2 connected between the gate 18 and collector 17 of the SCR help to stabilize its operation and turn off ability. Resistor R4 can be used to stabilize the initial wavefront from L1 to aid timing consistency.

Two distribution circuits that may be used in ignition systems according to this invention are shown in FIG. 1. FIG. 1a shows a dual spark transformer with a single primary and dual output secondary for firing two spark plugs. FIG. 1b shows two step-up coils connected in series to fire two spark plugs.

Figure 4:
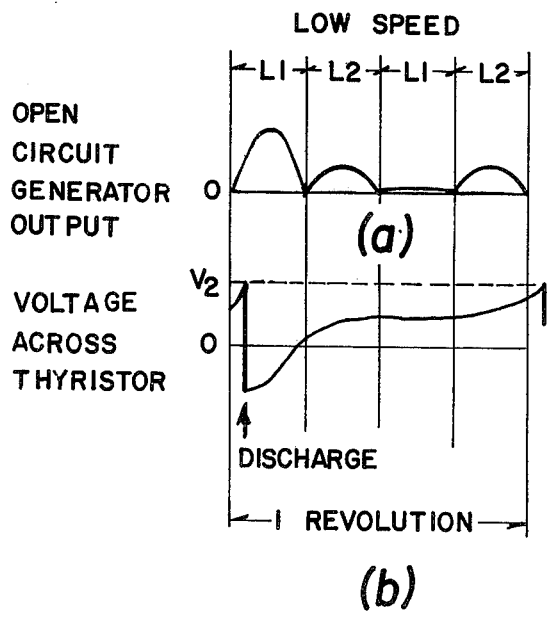
FIGS. 4 and 5 show the wave form of the voltage in an alternate embodiment at high and low speeds.
Figure 5:
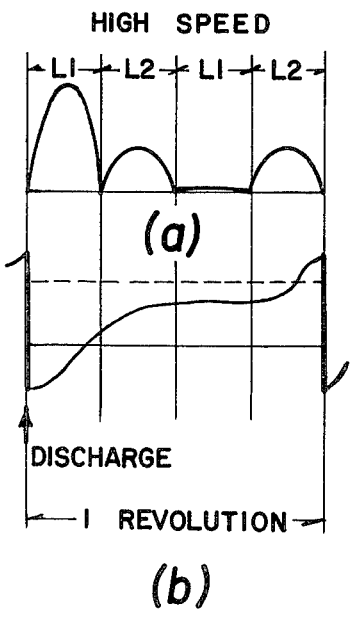

An ignition system according to this invention that will handle a 4-cylinder, 4-cycle engine with no distributor system may comprise the two pole generator shown in FIG. 6. On this generator, there is shown a second coil (comprising windings L'1 and L'2) arranged opposite from the first coil (comprising windings L1 and L2). A capacitive discharge circuit such as shown to the right of terminals A and B in FIG. 1 would be attached across the terminals A and B and across the terminals A' and B' shown in FIG. 6. The open circuit voltage outputs for windings L1 and L2 on one side of the generator shown in FIG. 6 are shown in FIGS. 4a and 5a. Because the positioning of the poles in the rotor and because of the direction of the windings L1 and L2 on the core, there is a significant output from winding L2 twice during every revolution of the generator rotor but only once for winding L1. As in the embodiment described above, the trigger circuit is activated only when L1 is generating. Hence, as before, only one spark per revolution of the generator should occur. (An exception to this rule is when the threshold voltage is reached more than once during the same period when L1 is charging as explained below.) The wave form of the voltage across the thyristor of a capacitive discharge circuit attached to the generator shown in FIG. 6 is shown in FIGS. 4b and 5b.

Ignition systems according to this invention are particularly suitable for small engines wherein the magnet rotor is mounted directly on the crankshaft. One such application is the U.S. Army Miliary Standard 1½, 3 and 6 horsepower engines (models 1A08, 2A016 and 4A032). In such engines a magneto having the alternate two pole rotor of the type shown in FIG. 6 may be used with an ignition circuit as shown in FIG. 1 in which the various elements have the characteristics set forth in the following table:

| | |
|---|---|
| Winding L1 | 10,000 turns |
| Winding L2 | 3,000 turns |
| Diode D1 and Diode D3 | 1N4005 |
| Diode D2 | 1N4003 |
| Zener Diode | 102 V. |
| SCR | TI XC34B |
| Storage capacitor C | 4 mfd., 200V. |
| Resistor R2 | 180 ohm, ¼ watt |
| Capacitor C2 | 0.1 mfd., 3V. |
| Diode D4 (optional) | 1N4003 |
| Resistor R1 (optional) | not used |
| Resistor R3 (optional) | not used |
| Resistor R4 (optional) | 100,000 ohms, ½ watt |

This system provides approximately 20° retard at 200 RPM of the magnet rotor. As the speed is increased, the timing advances. From approximately 1700 RPM's to 4000 RPM's, timing is essentially constant. Between approximately 400 RPM's and 2500 RPM's the system may produce two sparks with the second one occurring around 50° A.T.D.C. In no case does the system fire its initial spark earlier than its full advance, for example, about (1700 to 4000 RPM's) or later than the full retard, for example, about (200 RPM's). This condition causes no engine malfunction. Above approximately 2500 RPM's one spark only is produced and timing is very consistent.

FIG. 7 shows another possible AC generator. The eight pole laminated rotor and laminated stator with two magnets and two windings shown produces eight AC pulses per revolution. It will charge the capacitor and fire the SCR eight times per revolution. When used with an eight cylinder distributor (either high or low tension) and an appropriate number of step-up coils, this ignition system can handle an eight cylinder engine. The generator in this case must be synchronized with the crankshaft of the engine such that it turns one revolution for every two revolutions of the crankshaft of a 4-cycle engine; or one revolution for every revolution of the crankshaft of a 2-cycle engine.

FIG. 8 shows another of the many possible generator and coil distribution systems that may be used in ignition systems according to this invention. Shown is a four pole magnet rotor with alternating N and S poles and a conventional laminated stator. In this example, four coils positioned in slots 90° apart comprise the stator. Two of these coils connected in series form each of the two windings L1 and L2 required. This combination produces two alternating wave forms (AC cycles) per revolution resulting in charging the capacitor and firing the thyristor twice per revolution. A single high tension coil receives the capacitor discharge output of the circuit. A high tension distributor runs through reduction gears then distributes the coil output to the various cylinders. For six cylinders, a 3:1 gear ratio is required; for four cylinders, a 2:1 ratio is required. In either case the system is synchronized to the engine so that the distributor rotates at one-half the crankshaft speed for a 4-cycle engine.

The capacitive discharge circuit shown in FIG. 8 differs somewhat from that shown in FIG. 1. The voltage sensitive circuit comprises a Diac connected on one side to the trigger terminal of the SCR and at the other side to a voltage divider circuit comprising resistors R6 and R7 in series with diode D3. Capacitor C3 provides a sharp current pulse when the breakdown or threshold voltage is reached.

Having thus described my invention with the detail and particularity as required by the Patent Laws, what is desired protected by Letters Patent is set forth in the following claims:

1. An ignition system for an internal combustion engine comprising an alternating current generator synchronized with the engine, said alternating current generator having two windings, said two windings being of unequal turns and of opposite polarity, at least one high tension ignition coil having a primary and secondary winding, at least one first circuit for creating and releasing a capacitive discharge through the primary winding, and at least one second circuit including at least one spark plug in series with the secondary winding, said capacitive discharge circuit comprising a storage capacitor, a thyristor having two main terminals and at least one trigger terminal, said main terminals in series with said capacitor and primary winding, a rectifying circuit connected to the alternating current generator and to the storage capacitor for charging the capacitor with a direct current, a voltage sensitive trigger circuit connected to the high turns winding of said generator and to the trigger terminal of the thyristor whereby when the voltage in the trigger circuit reaches a given threshold voltage, the thyristor is triggered discharging the capacitor through the primary winding of the coil.

2. An ignition system according to claim 1 wherein the voltage sensitive trigger circuit comprises a zener diode in series with a rectifying diode.

3. An ignition system according to claim 2 wherein the rectifying circuit comprises two diodes having common output terminals.

4. An ignition system according to claim 3 wherein a circuit for stabilizing the operation of the thyristor is connected between the trigger terminal and the main terminal of the thyristor common with the primary winding.

5. An ignition system according to claim 4 wherein the stabilizing circuit comprises a parallel connected capacitor and resistor.

6. An ignition system according to claim 4 wherein a circuit for minimizing the negative voltage excursion of the storage capacitor is provided in parallel therewith.

7. An ignition system according to claim 6 wherein the circuit for minimizing excursion comprises a resistor and a diode in series.

8. An ignition system according to claim 4 wherein a resistor is connected in series with the zener diode and the storage capacitor.

9. An ignition system according to claim 4 wherein a large resistor is connected in parallel with the high turns winding of the generator.

10. An ignition system according to claim 1 in which each winding consists of coils wound on a common core.

11. A primary circuit according to claim 3 in which each winding consists of coils wound on a common core.

12. A primary circuit for an ignition system for an internal combustion engine comprising an alternating current generator synchronized with the engine, said alternating current generator having two windings, said windings being of unequal turns and of opposite polarity, a storage capacitor, a rectifying circuit connected to said generator and said storage capacitor for charging said capacitor, a thyristor having at least two main terminals and one trigger terminal, said main terminals connected in series with the capacitor and the output terminal of said primary circuit, a voltage sensitive trigger circuit connected to the high turns winding of the generator and the trigger terminal of said thyristor whereby when the voltage in the trigger circuit reaches a given threshold voltage, the thyristor is triggered discharging the capacitor to the output of the primary circuit.

13. A primary circuit according to claim 12 wherein the voltage sensitive trigger circuit comprises a zener diode in series with a rectifying diode.

14. A primary circuit according to claim 13 wherein the rectifying circuit comprises two diodes having common output terminals.

15. A primary circuit according to claim 14 wherein a circuit for stabilizing the operation of the thyristor is connected between the trigger terminal and the main terminal of the thyristor common with the primary winding.

16. A primary circuit according to claim 15 wherein the stabilizing circuit comprises a parallel connected capacitor and resistor.

17. A primary circuit according to claim 15 wherein a circuit for minimizing the negative voltage excursion of the storage capacitor is provided in parallel therewith.

18. A primary circuit according to claim 17 wherein the circuit for minimizing excursion comprises a resistor and a diode in series.

19. A primary circuit according to claim 14 wherein a resistor is connected in series with the zener diode and the storage capacitor.

20. A primary circuit according to claim 14 wherein a large resistor is connected in parallel with the high turns winding of the generator.

\* \* \* \* \*

UNITED STATES PATENT OFFICE
CERTIFICATE OF CORRECTION

PATENT NO. : 3,933,139
DATED : January 20, 1976
INVENTOR(S) : Bruce R. Beeghly

It is certified that error appears in the above-identified patent and that said Letters Patent are hereby corrected as shown below:

Column 3 Line 39
"provide" should read --prevent--.

Signed and Sealed this thirtieth Day of March 1976

[SEAL]

Attest:

RUTH C. MASON
Attesting Officer

C. MARSHALL DANN
Commissioner of Patents and Trademarks